Sept. 18, 1923.  
S. O. E. T. TROST  
1,468,250  
TRANSMITTER FOR WIRELESS TELEPHONY  
Filed June 21, 1921
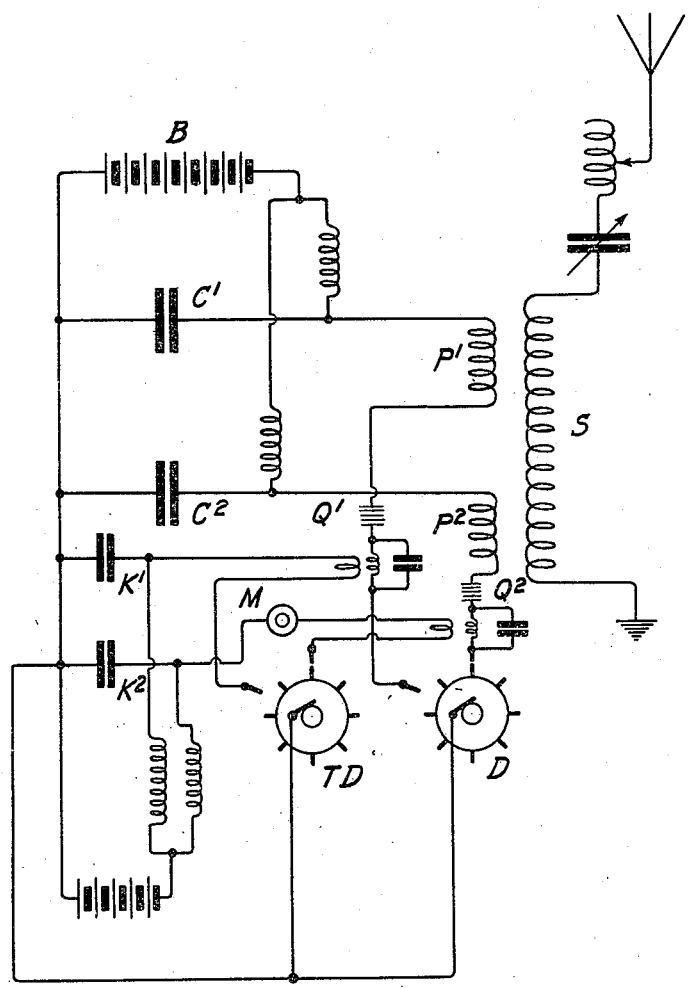
Inventor  
S.O.E.T. TROST.  
By his Attorney  
Ira J Adams Patented Sept. 18, 1923.

1,468,250

UNITED STATES PATENT OFFICE.

SOREN OLUF EMIL THERKELSEN TROST, OF LONDON, ENGLAND, ASSIGNOR TO RADIO CORPORATION OF AMERICA, A CORPORATION OF DELAWARE.

TRANSMITTER FOR WIRELESS TELEPHONY.

Application filed June 21, 1921. Serial No. 479,273.

(GRANTED UNDER THE PROVISIONS OF THE ACT OF MARCH 3, 1921, 41 STAT. L., 1313.)

*To all whom it may concern:*

Be it known that I, SOREN OLUF EMIL THERKELSEN TROST, a Danish subject, of Marconi House, Strand, London, W. C., England, have made certain new and useful Improvements in Transmitters for Wireless Telephony (for which I have filed an application in Great Britain August 16, 1919, Patent 11,831 of 1915) of which the following is a specification.

The object of this invention is to provide an improved transmitter for wireless telephony.

According to this invention we provide means for setting up in an aerial two or more sets of oscillations, the phases thereof being such that the oscillations normally neutralize each other, and we control the phase of one set by a microphone or the like. When the microphone is in action it alters the phase of one or more of the sets of oscillations, so that they no longer neutralize each other and oscillations corresponding to those of the michrophone are consequently emitted. Preferably the oscillations are controlled by a circuit of small power which in its turn is controlled by the microphone.

Preferably also we employ semi-continuous oscillations produced as described in U. S. Patent 1,271,190.

In the accompanying diagram we illustrate our invention as applied to such a transmitter.

$C^1$ $C^2$ are condensers continuously connected to a source of current B and discharged in succession by a disk discharger D through quenching devices $Q^1$ $Q^2$ and primaries $P^1$ $P^2$ of a secondary S in the aerial circuit. The time of the discharge is controlled by the discharges of auxiliary condensers $K^1$ $K^2$ effected by a second disk discharger T D, as described in the specification already referred to. M is a microphone inserted in the discharging circuit of the condenser $K^2$, or the microphone may be placed in the charging circuit of one of the condensers $K^1$ $K^2$.

Having described my invention, what I claim is:

1. In a transmitter for high frequency signals, the combination of means for producing two or more sets of oscillations which normally neutralize each other and means adapted to vary the relative phase of the oscillations for the production of signals.

2. In a transmitter for high frequency signals the combination of means for producing two or more sets of oscillations which normally neutralize each other, low power circuits adapted to vary the relative phase and means adapted to control the low power circuits for the production of signals.

3. In a transmitter for wireless telephone, the combination of means for producing in an aerial two or more sets of oscillations which normally are of opposite phase and neutralize each other, and a microphone adapted to control the phase of the oscillations of one set, substantially as described.

4. In a transmitter for wireless telephone, the combination of means for producing in an aerial two or more sets of oscillations which normally are of opposite phase and neutralize each other, low power circuits adapted to control the phases and a mircophone adapted to control one of the low power circuits, substantially as described.

5. In a transmitter for wireless telephony the combination of means for producing in an aerial two or more sets of oscillations which normally are of opposite phase and neutralize each other and a microphone adapted to dephase the oscillations whereby currents are induced in the aerial.

6. In a transmitter for wireless telephony the combination of means for producing in an aerial two or more sets of oscillations which normally are of opposite phase and neutralize each other, low power circuits adapted to control the phases and a microphone adapted to dephase one of the low power circuits whereby currents are induced in the aerial.

SOREN OLUF EMIL THERKELSEN TROST.